United States Patent [19]

Ross

[11] 4,017,854
[45] Apr. 12, 1977

[54] APPARATUS FOR ANGULAR MEASUREMENT AND BEAM FORMING WITH BASEBAND RADAR SYSTEMS

[75] Inventor: Gerald Fred Ross, Lexington, Mass.

[73] Assignee: Sperry Rand Corporation, New York, N.Y.

[22] Filed: Aug. 21, 1975

[21] Appl. No.: 606,673

[52] U.S. Cl. .......................... 343/16 R; 343/113 R
[51] Int. Cl.² ....................... G01S 9/02; G01S 3/50
[58] Field of Search ...................... 343/16 R, 113 R

[56] References Cited
UNITED STATES PATENTS

| | | | |
|---|---|---|---|
| 2,962,714 | 11/1960 | Meixell et al. | 343/113 R X |
| 3,154,778 | 10/1964 | Kock | 343/16 R X |
| 3,346,862 | 10/1967 | Raudsep | 343/113 R |

Primary Examiner—T.H. Tubbesing
Attorney, Agent, or Firm—Howard P. Terry; Seymour Levine

[57] ABSTRACT

A system for achieving improved angular resolution with baseband radar systems which includes dual baseband receivers and a correlator or tapped transmission line therebetween. The tap on the transmission line at which pulses received by each receiver coalesce determines the angular location of a target with an angular resolution that is proportional to the ratio of the pulse width to the receiver separation.

5 Claims, 3 Drawing Figures

APPARATUS FOR ANGULAR MEASUREMENT AND BEAM FORMING WITH BASEBAND RADAR SYSTEMS

BACKGROUND OF THE INVENTION

1. Field of the Invention

The invention pertains to the field of baseband radar systems and more particularly to means for beam narrowing and target angle measurement with baseband radar systems.

2. Description of the Prior Art

Systems employing subnanosecond baseband pulses for object detection generally exhibit beam widths that are too broad for the effective discrimination of angularly displaced targets. Conventionaly, angular resolution is achieved in the radar system by the utilization of narrow beam antennas. However, these antennas have relatively narrow frequency bands and antennas that are broadband enough to propagate subnanosecond pulses also have an inherently broad beam width. Where it is desired to detect targets within about five feet from the antenna, the inherent broad beam widths produced by baseband antennas are not a particular problem because the outer boundary of the range gate and the natural fall off of the antenna response severely restricts the area covered at the shorter range. For some distances beyond this range, signal processing techniques have been sUccessfully employed to narrow the effective beam widths. One such technique has been described in U.S. Pat. No. 3,858,205 issued Dec. 31, 1974 to Ross and assigned to the assignee of the instant invention. However, these techniques become virtually ineffective when the range to the target becomes very large compared to the transmitter-receiver spacing.

It is difficult to obtain a system that exhibits both a narrow effective beam width and negligible signal dispersion (i.e., a wide band width). In antenna array systems, for example, one can obtain a narrow beam by employing a multiplicity of elements and making the aperture dimensions many wavelengths. However, to simultaneously obtain a wide bandwidth it is necessary to employ real time delays in the element feed network rather than instantaneous phase shift behind each element to afford coherent addition at the appropriate sum port.

This invention describes a novel method for achieving a narrow effective beam width, for a baseband radar system, in which only two receiving antennas are employed and wherein the system effectIve beam width is directly proportional to the pulse width of the received signals.

SUMMARY OF THE INVENTION

The present invention relates to an electromagnetic energy pulse system for transmitting very short baseband pulses and for the reception of such pulses by dual baseband receivers, the receiving antennas of which are separated by a distance that is very much less than the range to the target to be detected. The baseband receivers amplify the received baseband signals, the amplified signals being utilized for further processing. The amplified baseband pulses from each receiver are fed to opposite ends of a tapped transmission line whereon the angle to the target is determined by the tap at which the two pulses coalesce. These taps are spaced along the transmission line a distance somewhat greater than one-half the product of the signal velocity on the transmission line and the duration of the received and reconstituted pulses, thus providing a means with which the relative time delays between the two receiving antennas may be determined to within one half the pulse width and concomitantly establishing a radiant beam width for the system that is proportional to the ratio of the pulse duration to the distance separating the two antennas.

DESCRIPTION OF THE PREFERRED EMBODIMENTS

Figure 1:
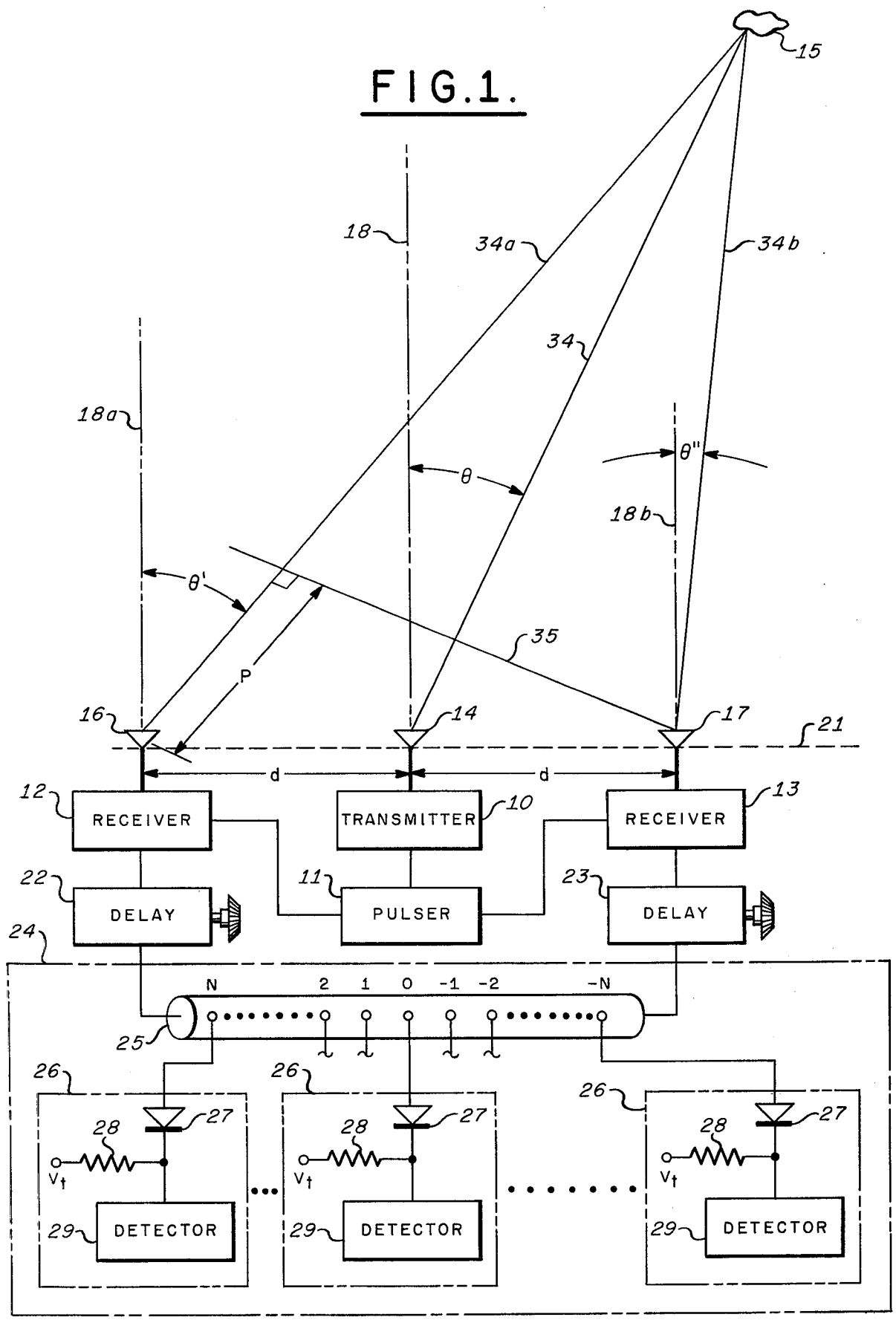
FIG. 1 is a block diagram of the invention showing its components, their electrical connections and the geometrical relationship of the target transmitter and receivers.

Referring to FIG. 1, a baseband pulse transmitter 10 may be employed in the invention and is actuated by a conventional current pulse generator 11 which also supplies any synchronizing signals for control of the baseband receivers 12 and 13. Transmitter 10 provides pulse signals for forward radiation by an antenna 14. Signals reflected by any object 15 are collected by the receiver antennas 16 and 17, for supply to the receivers 12 and 13, respectively, receiver antennas 16 and 17 being symmetrically located on either side of transmitter antenna 14 and separated a distance $d$ therefrom, the distance d being very much shorter than the length of the ray path 34 from the antenna 14 to the reflecting object 15. Ray path 34 is at an angle $\theta$ from the perpendicular 18 to the base line 21 which passes through the antennas 14, 16 and 17, while the ray path 34a between receiving antenna 16 and the object 15 and the ray path 34b between receiving antenna 17 and the object 15 each form angles $\theta'$ and $\theta''$, respectively, with the perpendiculars 18a and 18b. The geometry of FIG. 1 is very much distorted for the sake of clarity. Though not apparent in FIG. 1, ray paths 34, 34a and 34b are very much greater than $d$. Thus, the angles $\theta'$ and $\theta''$ which ray paths 34a and 34b form with the perpendiculars 18a and 18b are approximately equal to $\theta$, making the three ray paths 34, 34a and 34b nearly parallel.

Transmitter 10 and its associated antenna may take any of several forms. Descriptions of suitable combinations being given in U.S. Pat. No. 3,659,203 issued Apr. 25, 1972 to Ross and Lamensdorf and in U.S. Pat. No. 3,728,632 issued Apr. 17, 1973 to Ross. In addition the antennas described in the aforementioned patents may be combined with a transmitter described in U.S. Pat. No. 3,832,568 issued Aug. 27, 1974 to Wang. All of the aforementioned patents are assigned to the assignee of the instant invention.

Each of receivers 12 and 13 may be baseband receivers of the general kind described in U.S. Pat. No. 3,662,316 issued May 9, 1972 to Robbins and in U.S. Pat. No. 3,728,632 issued Apr. 17, 1973 to Ross. Both applications being assigned to the assignee of the instant invention. The output signals from the receivers 12 and 13, which are reconstituted video pulses derived from the pulses received at receiving antennas 16 and 17, are coupled to adjustable delay lines 22 and 23, respectively, which in turn couple signals to a correlator 24. These delay lines may be utilized to compensate for differentail time delays encountered in receivers 12 and 13 and other inherent differential time delays. Other functions of the adjustable delays 22 and 23 remain to be discussed. In its preferred form, the correlator 24 includes a transmission line 25 and a number of equally spaced taps located thereon. One end of the transmission line 25 is coupled to the output terminal of variable delay 22 and the other end is coupled to the output terminal of variable delay 23 whereby the output pulses from the variable delays 22 and 23 are coupled to transmission line 25 and propagate thereon in opposite directions. Connected at each tap of transmission line 25 is a coincident detector 26 which comprises a diode 27 biased to a threshold voltage $V_t$ via resistor 28 and a detector circuit 29.

Reconstituted video pulses that are coupled to transmission line 25 are of essentially equal duration and amplitude. When these pulses are simultaneously launched on transmission line 25 with a pulse width that is very much less than the transit time across the transmission line, the two pulses will meet only in the vicinity of tap zero which is located at the midpoint of the transmission line 25. At this tap a pulse will form with an amplitude equal to twice the amplitude of each of the output pulses from variable delays 22 and 23 with a pulse duration equal to the pulse width of each of the launched pulses. Transmission line 25 possesses a center tap 0 and taps on either side thereof. Taps to the left of the center tap 0 are numbers with positive integers and those to the right with negative integers. If the output pulse from variagble delay 22 is delayed reiative to the output pulse from variable delay 23 prior to being launched on the transmission line 25, the double amplitude pulse will form at one of the positively numbered taps whereas, if the output pulse from variable delay 23 is launched on transmission line 25 with a delay relative to the output pulse from variable delay 22, the double amplitude pulse will form at one of the negatively numbered taps. When the pulses coalesce at a given tap, the diode 27 conducts, coupling a pulse to detector circuit 29 which provides an indication that the pulses received at antennas 16 and 17 have the time relationship represented by the given tap. To prevent conduction when the two pulses do not coalesce, the diode 27 is backbiased at a voltage between the peak pulse amplitude and twice the peak pulse amplitude by the threshold voltage $V_t$.

Figure 2:
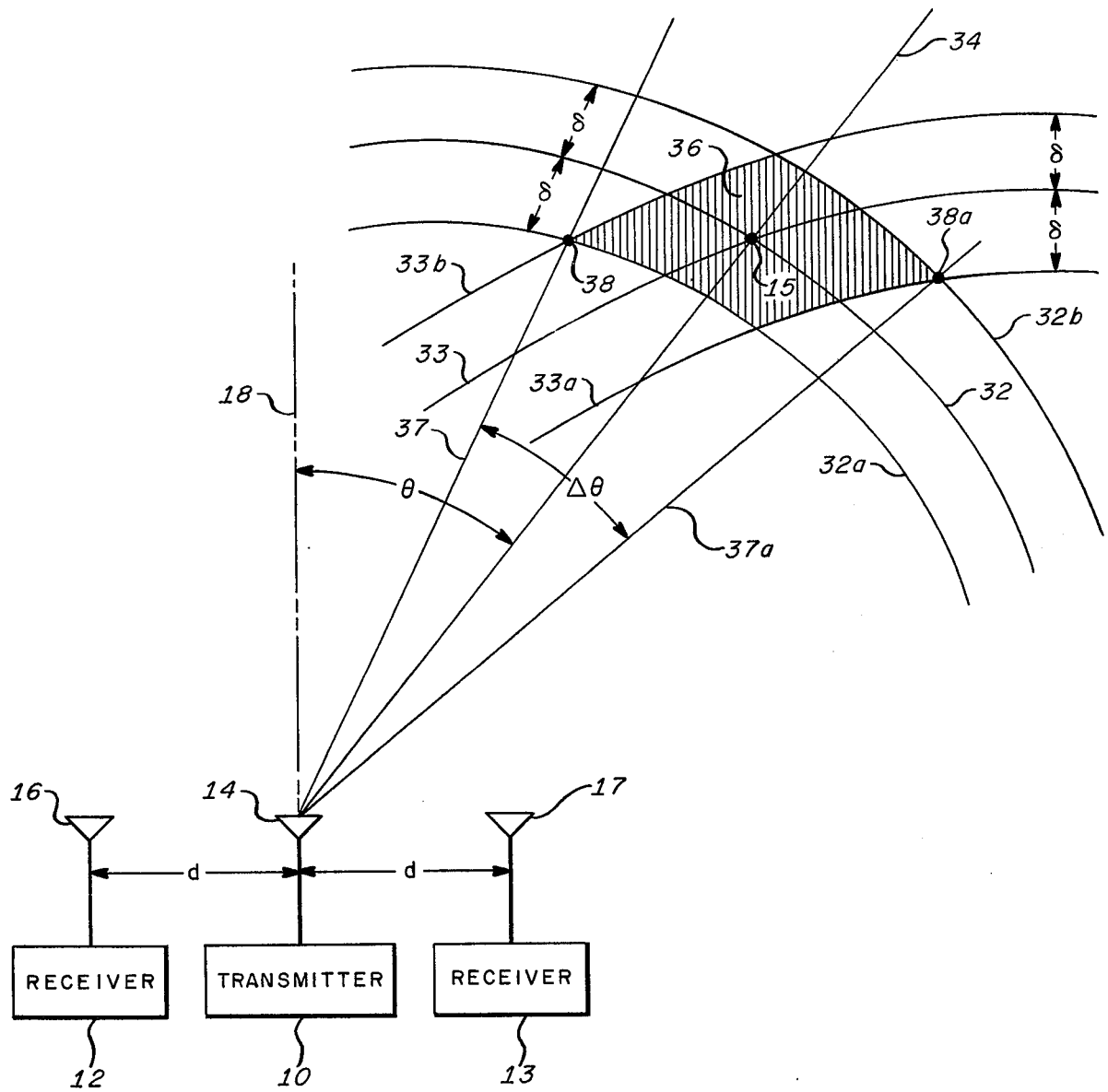
FIG. 2 is a graph useful in explaining the operation of the invention.
Figure 3:
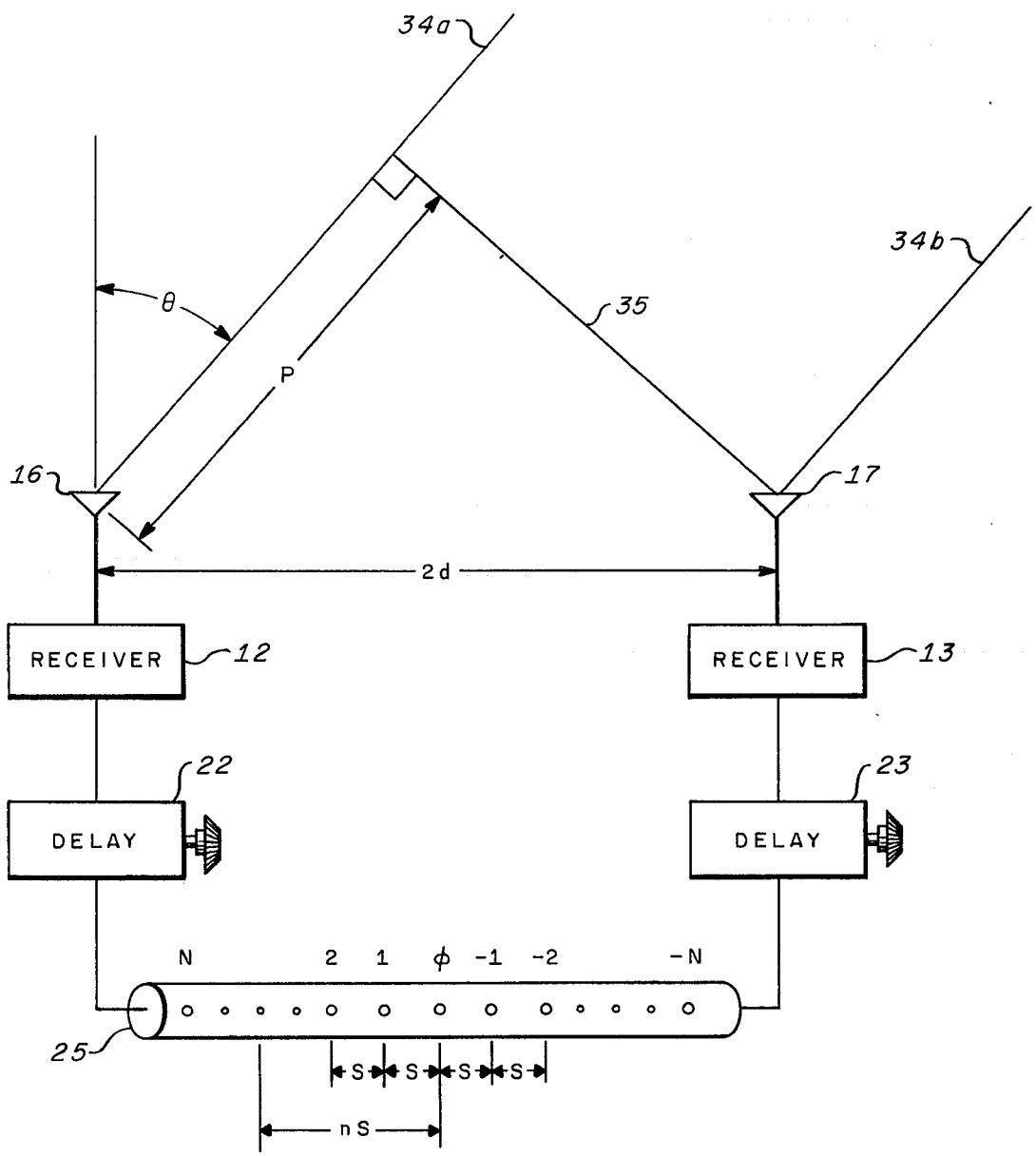
FIG. 3 is a graph and simplified block diagram useful in explaining the operation of the invention.

Refer to FIG. 2 and assume that receiver antennas 16 and 17 each has received a reflected pulse from an object 15, the object 15 having been illuminated by a pulse radiated from the transmitter antenna 14. The reflecting object 15 is located at the intersection of an ellipse 32, which is defined by the spacing between the receiver antenna 16 and the transmitter antenna 14, which are the foci of the ellipse, and the total path length from the transmitting antenna 14 to the object 15 and from the object 15 to the receiver antenna 16, and an ellipse 33 similarly defined by the receiver antenna 17 and the transmitter antenna 14. Since the separation d between the transmitter antenna 14 and the receiver antennas 16 and 17 is very much less than the range to the reflectin object 15, the ray path 34 which forms an angle $\theta$ with the perpendicular 18 from the transmitter antenna 14 to the reflecting object 15 is nearly parallel to the ray paths 34a and 34b from the reflecting object to the receiver antennas 16 and 17, respectively, as previously discussed. Concomitantly, the angles $\theta'$ and $\theta''$, FIG. 1, that these ray paths make with the perpendiculars 18a and 18b are approximately equal to the angle $\theta$. Thus the path length difference P, shown in FIGS. 1 and 3, between the ray paths 34a and 34b, as determined by the perpendicular 35 from the receiving antenna 17 to the ray path 34a, is given by P $= 2d \sin \theta$ whereby, the differential time delay T, between reception at antenna 17 and reception at antenna 16 is P/c, where c is the signal velocity in free space. If the tap spacing S, as shown in FIG. 3, is sufficient for the resolution of two pulses, i.e., is equal to one-half the distance that a signal with signal velocity v along the transmission line 25, travels during the pulse width interval $\tau$, and ns is the distance from the center of the transmission line 25 to the tap at which the two pulses, launched from opposite ends of the transmission line 25, coalesce, where n is the tap number which can take on values of 0, $\pm 1, \pm 2 \ldots \pm N$, it should be obvious to those skilled in the art that $$\theta = \sin^{-1} \frac{c}{v} \cdot \frac{ns}{d} = \sin^{-1} n \frac{c\lambda}{2d}$$

Thus the tap at which the two pulses launched on the transmission line 25 coalesce determines the angular location from boresight of the reflecting object 15.

Again, referring to FIG. 2, wherein ellipses 32 and 33 are median ellipses, each of which are bounded by ellipses that define the range resolution $2\delta$ of the transmitter 10, receiver 12, and transmitter 10, receiver 13 combinations. The bounding ellipses 32a and 32b which bound median ellipses 32 and 33a and 33b which bound median ellipse 33 define a resolution cell 36 with an angular resolution defined by the angle between the ray path 37 from the transmitter antenna 14 to the intersection 38 of ellipses 32a and 33b and the ray path 37a from the transmitter antenna 14 to the intersection 38a of ellipses 32b and 33a. From the geometry shown in FIGS. 1 and 2 and the foregoing discussion, it should be obvious to those skilled in the art that the measurement of the angle $\theta$, by noting the tap at which the two pulses launched from opposite ends of the transmission line 25 coalesce, provides an angular resolution or beam width $\Delta\theta$ and a range resolution $2\delta$ that are given by:

$$\Delta\theta = 2 \sin^{-1} \frac{c\lambda}{4d \cos \theta}$$

$$2\delta = \frac{c\lambda}{2}$$

Thus the angular resolution, for angles to the object 15 near boresight and for $c\lambda$ very much less than the spacing d between the transmitter antenna 14 and receiver antennas 16 and 17 is approximately $$\frac{c\lambda}{2d}.$$

The angular region of detection may be limited by restricting the length of the transmission line 25 or the number of taps thereon. Thus the transmission line 25 with a single centrally located tap emits the angular coverage to the resolution cell about boresight. Beam scanning to either side of boresight may be accomplished with this arrangement by adjusting either variable delay 22 or 23, which previously has been adjusted to compensate for differential time delays inherent in the receiver antenna combinations. The angle through which the beam is scanned by this procedure is defined by:

$$\theta_s = \sin^{-1} \frac{cT}{2d}$$

where T is the differential time delay inserted in either delay 22 or 23.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. An apparatus for angular measurement and beam forming with baseband radar systems comprising:
   transmitter means for radiating baseband electromagnetic pulses to illuminate an object to be detected;
   first and second receiver means spaced apart and symmetrically disposes with respect to said transmitter means for receiving baseband electromagnetic pulses reflected from said object; and
   means cooupled to said first and second receiver means for determining the time delay between the reception of said reflected baseband pulse at said first receiver means and the reception of said reflected baseband pulse at said second receiver means said time delay determining said angular position of said object within a beam in space having an effective beam width that is a function of the ratio of the width of said baseband pulse to said spacing between said receiver means.

2. An apparatus for angular measurement and beam forming with baseband radar systems in accordance with claim 1 wherein said time delay determination means comprises:
   a transmission line including first and second input terminals, said terminals coupled respectively to said first and second receiver means;
   a multiplicity of taps on said transmission line;
   detector means, coupled to each of said taps on said transmission line, for detecting baseband pulses when said pulses launched from said first and second input terminals of said transmission line coalesce at one of said taps whereby the time delay between the reception of said baseband pulse at said first receiver and the reception of said baseband pulse at said second receiver is established thereby determining said angular location of said object within a beam in space having an effective beam width that is proportional to the ratio of the width of said baseband pulse to said spacing between said receiver means.

3. An apparatus for angular measurement and beam forming with baseband radar systems in accordance with claim 2 wherein said multiplicity of taps on said transmission line are essentially equally spaced with said spacing being essentially equal to one-half the product of the signal velocity on said transmission line and the duration of said baseband pulse transmitted by said transmitter means.

4. An apparatus for angular measurement and beam forming with baseband radar systems in accordance with claim 3 additionally including in series relation between each of said receiver means and said transmission line a means for providing an adjustable delay whereby an effective shift of said formed beam may be accomplished by varying the time delay between one of said reveiver means and said transmission line.

5. An apparatus for angular measurement and beam forming with baseband radar systems in accordance with claim 2 wherein said transmission line possesses one centrally located tap.

* * * * *